United States Patent [19]

Grassens et al.

[11] Patent Number: 5,790,325
[45] Date of Patent: Aug. 4, 1998

[54] METHOD AND APPARATUS FOR FOCUSING A LENS

[75] Inventors: Leonardus J. Grassens, Monument; Hollis O'Neal Hall, II, Colorado Springs, both of Colo.

[73] Assignee: Discovision Associates, Irvine, Calif.

[21] Appl. No.: 474,831

[22] Filed: Jun. 7, 1995

(Under 37 CFR 1.47)

Related U.S. Application Data

[62] Division of Ser. No. 418,698, Apr. 7, 1995, Pat. No. 5,742,441.

[51] Int. Cl.$^6$ .................................................. G02B 7/02
[52] U.S. Cl. ............................................ 359/822; 359/823
[58] Field of Search ................................... 359/822, 819, 359/813, 814, 823, 824; 369/54, 13

[56] References Cited

U.S. PATENT DOCUMENTS

| | | | |
|---|---|---|---|
| 2,771,003 | 11/1956 | Lyndall et al. | 88/39 |
| 3,638,933 | 2/1972 | Burnette et al. | 269/60 |
| 4,142,098 | 2/1979 | Korpel | 250/201 |
| 4,652,095 | 3/1987 | Mauro | 359/393 |
| 4,772,109 | 9/1988 | Cutburth et al. | 359/393 |
| 4,913,527 | 4/1990 | Jessop | 359/823 |
| 5,075,977 | 12/1991 | Rando | 33/227 |
| 5,132,944 | 7/1992 | Berg | 369/13 |
| 5,313,332 | 5/1994 | Schell et al. | 359/813 |
| 5,347,500 | 9/1994 | Eguchi | 369/44.14 |
| 5,493,546 | 2/1996 | Kasahara | 369/44.15 |
| 5,532,989 | 7/1996 | Getreuer et al. | 369/44.15 |

FOREIGN PATENT DOCUMENTS

| | | |
|---|---|---|
| 58-168021 | 10/1983 | Japan . |
| 60-256108 | 12/1985 | Japan . |

*Primary Examiner*—George Y. Epps
*Assistant Examiner*—Ricky Mack
*Attorney, Agent, or Firm*—Ronald J. Clark; Robert T. Braun; Donald Bollella

[57] ABSTRACT

An apparatus for focusing an actuator lens within an optical disc carriage held by a baseplate assembly. The apparatus incudes a frame, a cradle assembly mounted to the frame, a tower assembly mounted to the frame, a lever assembly rotatably mounted to the frame, and a gripper assembly mounted to the lever assembly. The cradle assembly includes a baseplate alignment assembly having a source of radiant energy for projecting a beam of radiant energy, a member for determining the tilt alignment of the beam with respect to the tower assembly, and tilt actuators for aligning the tilt of the beam with respect to the tower assembly. The tower assembly includes a video camera having a camera lens, a tower magnifying lens, and a monitor for displaying a representation of a beam of radiant energy passing through the tower magnifying lens and into the video camera. A method for focusing an objective lens includes the steps of placing a lens in the carriage, directing a beam of radiant energy through the objective lens onto the optical disc, and aligning the beam with respect to the optical disc while maintaining the optical center of the objective lens at a predetermined intersecting point. A return beam of radiant energy is reflected from the optical disc and the spot profile of the return beam is analyzed. The objective lens is moved toward or away from the optical disc using a focus actuator until the analyzer indicates that the beam is in proper focus.

18 Claims, 7 Drawing Sheets

METHOD AND APPARATUS FOR FOCUSING A LENS

This is a division of application Ser. No. 08/418,698, filed Apr. 7, 1995 now U.S. Pat. No. 5,742,441.

BACKGROUND OF THE INVENTION

1. Field of the Invention

This invention relates to manufacturing of optical systems, and, in particular, to the manipulation and alignment of an objective lens during manufacture of an optical system.

2. Description of the Related Art

In the manufacture of prior optical systems, specific alignment of the objective lens with respect to a storage medium was not critical. In those systems, a spindle which holds the storage medium is aligned with respect to guide rails. A carriage rides along the guide rails, and the objective lens is placed within the carriage. Because of the information storage densities used in such optical systems were sufficiently low, and because manufacturing tolerances of the spindle, rails, and objective lens were sufficiently high, specific alignment of the objective lens was not necessary. The objective lens was placed, then tested for alignment within tolerable limits.

Another example of a prior optical system does perform active alignment of the objective lens. However, the objective lens is fixedly mounted to an actuator, and the objective lens/actuator combination is aligned with respect to a carriage assembly. Once aligned with respect to the carriage assembly, the actuator is mounted to the carriage assembly, which is aligned with respect to the storage medium. This prior optical system requires that the actuator be alignable with respect to the carriage assembly. Additionally, the actuator/carriage assembly combination is quite large relative to such assemblies in other optical systems.

SUMMARY OF THE INVENTION

As information storage densities increase, the alignment between the objective lens and the storage medium becomes more critical. As a result, either stricter manufacturing tolerances or improved alignment of the objective lens is necessary. Because stricter manufacturing tolerances increase manufacturing cost significantly, improved alignment of the objective lens allows higher information storage densities at an economically feasible cost.

An apparatus is described which aligns such an objective lens. The apparatus comprises a frame, a cradle assembly mounted to the frame with at least one degree of freedom of motion, a tower assembly mounted to the frame, a lever assembly rotatably mounted to the frame, and a gripper assembly mounted to the lever assembly. The cradle assembly includes a baseplate alignment assembly comprising a source of radiant energy for projecting a beam of radiant energy, means for determining the tilt alignment of the beam with respect to the tower assembly, and a plurality of tilt actuators for aligning the tilt of the beam with respect to the tower assembly. The baseplate alignment assembly may further comprise means for determining the lateral alignment of the beam with respect to the tower assembly and a plurality of lateral actuators for aligning the beam laterally with respect to the tower assembly. The tower assembly comprises a video camera having a camera lens, a tower magnifying lens, and a monitor for displaying a representation of a beam of radiant energy passing through the tower magnifying lens and into the video camera.

The gripper assembly comprises an objective lens assembly, a gripper objective lens mounted to the objective lens assembly, an objective lens alignment assembly for aligning the gripper objective lens with respect to the tower assembly and the cradle assembly, and an actuator lens tilt assembly for aligning the objective lens with respect to the tower assembly and the cradle assembly. The objective lens assembly further comprises a housing having an opening at one end for receiving an objective lens and a bellows structure on its surface to allow bending of the housing, a gripper objective lens, a non-opaque substrate mounted within the housing, and a pneumatic tube attached to the housing for creating a pressure differential between the interior and the exterior of the housing sufficient to hold the actuator lens against the opening. The objective lens alignment assembly further comprises an assembly support, a first lateral alignment support slidably mounted to the assembly support, a first lateral actuator for positioning the first lateral alignment support, a second lateral alignment support slidably mounted to the first lateral alignment support, a second lateral actuator for positioning the second lateral alignment support, a support frame having a frame base and a frame extension, mounted to the second lateral actuator, a support leaf spring mounted to the support frame and biasing the housing against the frame extension, and a focus actuator for positioning the frame extension with respect to the frame base. The actuator lens tilt assembly further comprises a flexure support ring; two flexure support plates; four flexure plates mounted at equal intervals around the flexure support ring, two of which are mounted to the housing and two of which are mounted to the flexure support plates; a first lever disposed against a flexure plate; a first tilt actuator mounted against the first lever for imparting motion on the first lever which is translated into rotational motion by the flexure support ring, the flexure support plates, and the flexure plates; a second lever disposed against a flexure plate; and a second tilt actuator mounted against the second lever for imparting motion on the second lever which is translated into rotational motion by the flexure support ring, the flexure support plates, and the flexure plates.

A method for aligning an actuator lens is described comprising the steps of moving a baseplate assembly with respect to the tower assembly, moving the objective lens assembly with respect to the tower assembly, and moving the actuator lens with respect to the tower assembly. The step of moving the baseplate assembly further comprises moving the baseplate assembly laterally with respect to the tower assembly and rotating the baseplate assembly with respect to the tower assembly. The step of moving the actuator lens further comprises moving the actuator lens laterally with respect to the tower assembly and rotating the actuator lens with respect to the tower assembly. Such a method may be used with the above-described apparatus.

For a better understanding of these and other objects of the present invention, reference is made to the detailed description of the invention which is to be read in conjunction with the following drawings, wherein:

DESCRIPTION OF THE PREFERRED EMBODIMENT

Figure 1:
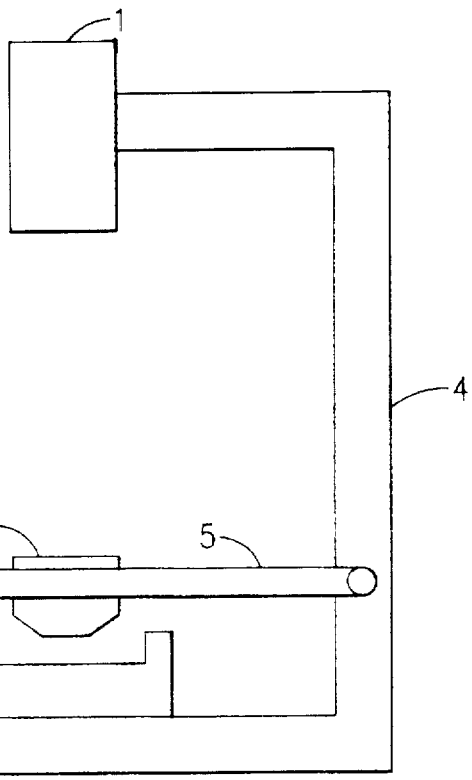
FIG. 1 is a generalized side view of one embodiment of the invention, showing the gripper assembly in a closed position.
Figure 2:
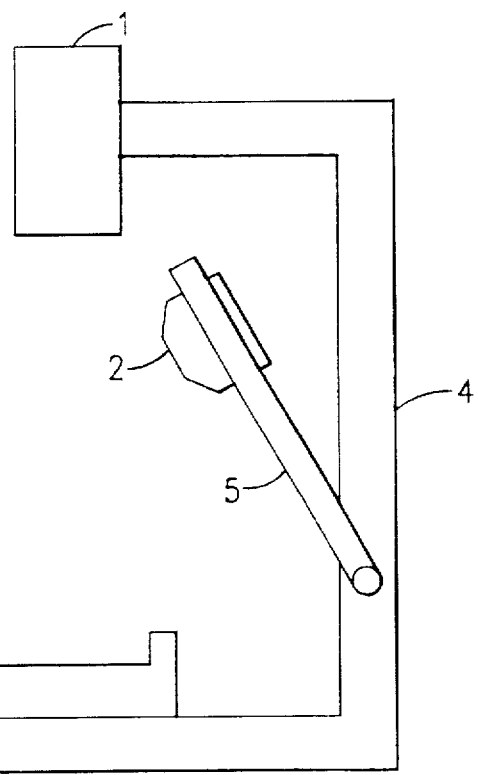
FIG. 2 is a generalized side view of one embodiment of the invention, showing the gripper assembly in an open position.

Referring to exemplary FIGS. 1 and 2, according to one aspect of the invention, the apparatus comprises a tower assembly 1, a gripper assembly 2, and a cradle assembly 3. The tower assembly 1 is fixedly mounted to a frame 4. The tower assembly 1 defines a tower axis. The gripper assembly 2 is fixedly mounted to a lever assembly 5, which is rotatably mounted to the frame 4. The cradle assembly 3 is mounted to the frame 4 with at least one degree of freedom of motion. A line between the tower assembly 1 and the cradle assembly 3 is referred to as an assembly axis. In the closed position, as shown in FIG. 1, the gripper assembly 2 is between the tower assembly 1 and the cradle assembly 3 along the assembly axis. In the open position, as shown in FIG. 2, the gripper assembly 2 is not along the assembly axis.

Figure 3:
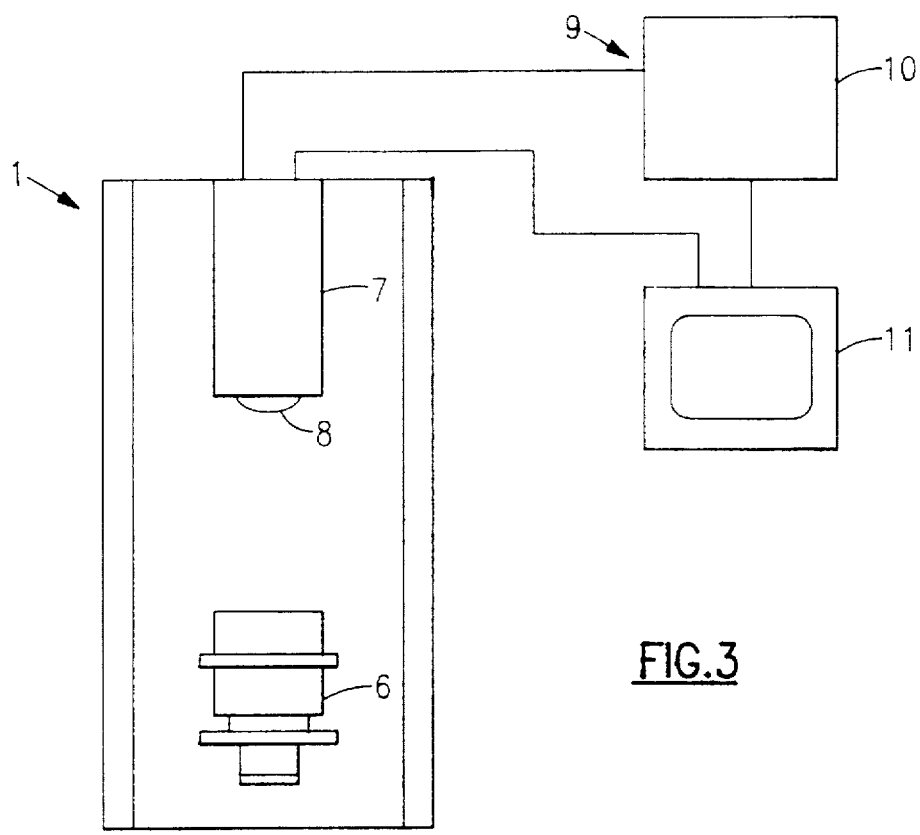
FIG. 3 is a cross-sectional view of the tower assembly, including an embodiment of the analysis assembly.

Referring to exemplary FIG. 3, a cross-section of the tower assembly 1 is shown in more detail. The tower assembly 1 comprises a tower magnifying lens 6 and a video camera 7 having a camera lens 8. The optical axes of the camera lens 8 of the video camera 7 and the tower magnifying lens 6 are the same, and are referred to collectively as the tower optical axis. The output from the video camera 7 is connected to an analysis assembly 9. The analysis assembly 9 may be any assembly suitable for analyzing the characteristics of a radiant beam of energy. In the embodiment shown in exemplary FIG. 3, the analysis assembly 9 comprises a processor 10 and a monitor 11.

Figure 4:
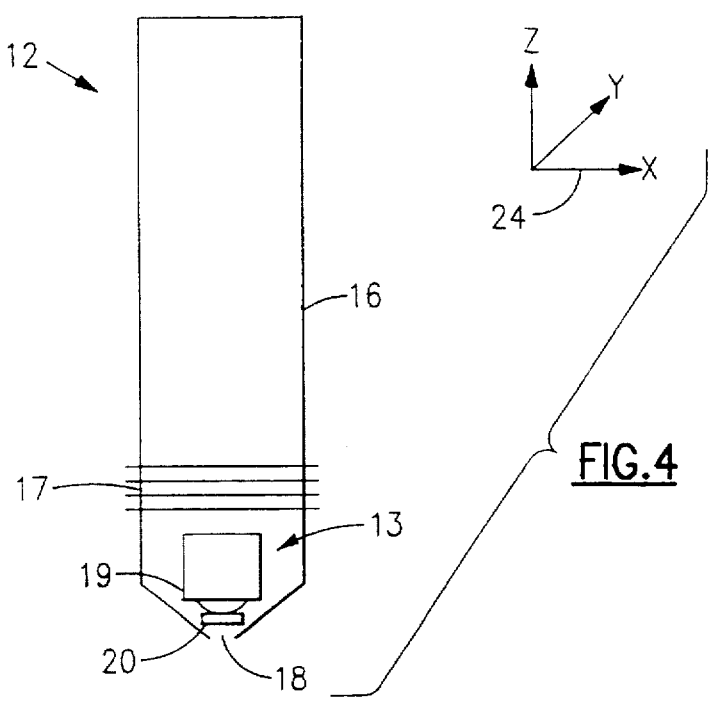
FIG. 4 is a cross-section view of the vacuum chuck and the microscope objective lens assembly.
Figure 5:
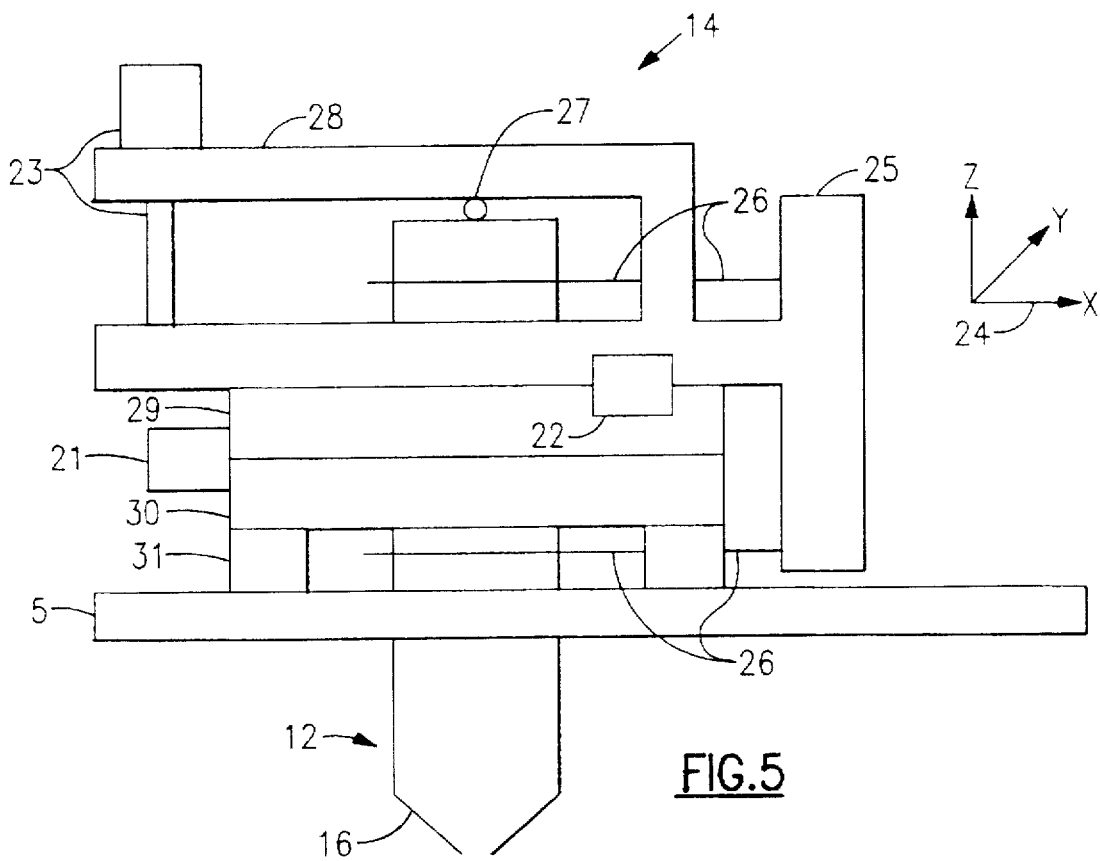
FIG. 5 is a view of the microscope objective lens alignment assembly.
Figure 6:
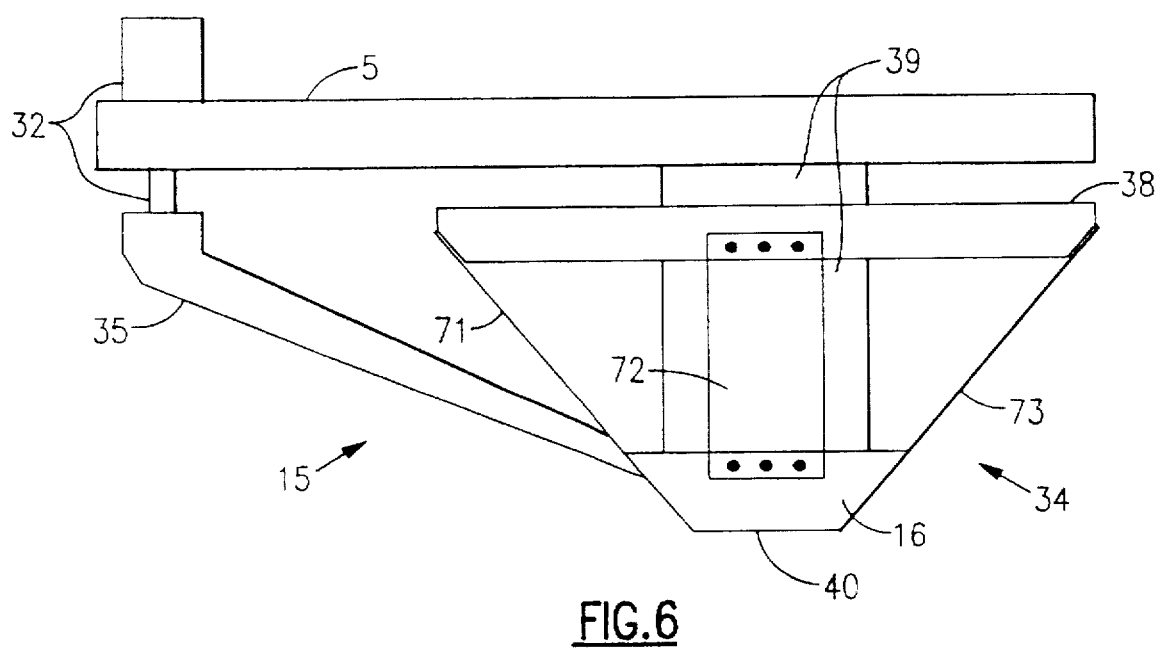
FIG. 6 is a side view of the actuator lens tilt assembly.
Figure 7:
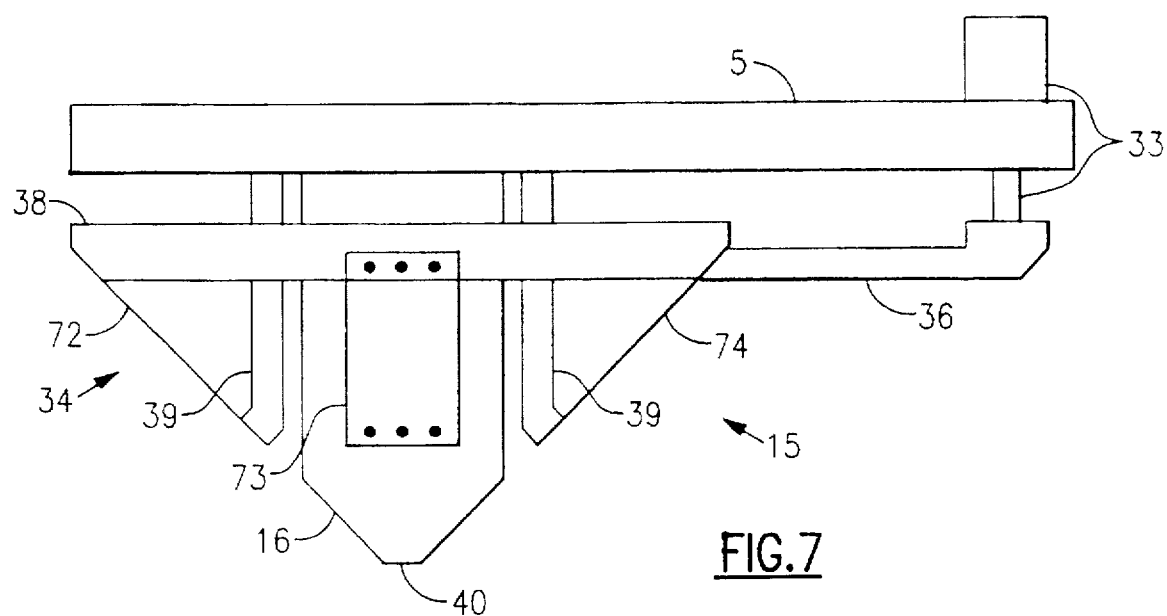
FIG. 7 is a front view of the actuator lens tilt assembly.

Referring to exemplary FIGS. 4, 5, 6 and 7, the gripper assembly 2 comprises a vacuum chuck 12, a microscope objective lens assembly 13, a microscope objective lens alignment assembly 14, and an actuator lens tilt assembly 15. FIG. 4 shows a cross-sectional view of one embodiment of the vacuum chuck 12 and the microscope objective lens assembly 13. FIG. 5 shows a view of one embodiment of the microscope objective lens alignment assembly 14. FIGS. 6 and 7 show two views of the actuator lens tilt assembly 15.

Referring to exemplary FIG. 4, the vacuum chuck 12 comprises a housing 16, a bellows structure 17, and an actuator lens receiving opening 18. A pneumatic tube (not shown) is connected to the housing 16. In operation, an actuator lens (not shown) is placed within the actuator lens receiving opening 18 such that the actuator lens receiving opening 18 is completely covered. The actuator lens may be an objective lens. Air is then evacuated from the housing 16 through the pneumatic tube (not shown) to create a pressure differential between the interior and the exterior of the housing 16. This pressure differential operates to hold the actuator lens against the actuator lens receiving opening 18 when the gripper assembly 2 moves. The housing 16 contains a bellows structure 17 to allow the housing 16 to bend while maintaining a pressure differential.

The microscope objective lens assembly 13 comprises a microscope objective lens 19 and a substrate 20. In operation, a beam of radiant energy will enter the housing 16 through the actuator lens receiving opening 18 and, if present, through the actuator lens. The beam will pass through the substrate 20 and through the microscope objective lens 19. The beam then passes through the housing 16 and into the tower assembly 1, where it passes through the tower magnifying lens 6 and is received by the video camera 7. Together, the microscope objective lens 19 and the tower magnifying lens 6 magnify the beam and focus the beam in the video camera 7. The tower magnifying lens 6 may be a tube lens. The substrate 20 simulates the optical properties of an information-bearing disk, and the effects of those properties on the beam. The substrate 20 is mounted such that, when the gripper assembly 2 is in the closed position, the substrate 20 is orthogonal to the tower optical axis.

Referring to exemplary FIG. 5, the microscope objective lens alignment assembly 14 comprises an X-axis lateral alignment actuator 21, a Y-axis lateral alignment actuator 22, and a focus actuator 23. Referring to exemplary FIG. 5, there is shown a reference coordinate system 24. This reference coordinate system 24 is chosen for purposes of explanation only, and it will be obvious to one skilled in the art that any convenient coordinate system could be chosen without departing from the spirit and scope of the present invention.

In the embodiment particularly shown in FIG. 5, a microscope support frame 25 having a frame extension 28 supports the housing 16 by a support leaf spring 26. The support leaf spring 26 biases the housing 16 against a cylindrical bearing 27 located between the housing 16 and a frame extension 28. The focus actuator 23 is mounted to the frame extension 28, and maintains a distance between the frame extension 28 and the microscope support frame 25 along the Z-axis, as indicated by the reference coordinate system 24. Motion of the housing 16 along the Z-axis adjusts the focus of the microscope objective lens 19 in combination with the tower magnifying lens 6.

The microscope support frame 25 is mounted on a Y-axis lateral alignment support 29 such that the microscope support frame 25 may slide relative to the Y-axis lateral alignment support 29 along the Y-axis, as indicated by the reference coordinate system 24. The Y-axis lateral alignment actuator 22 is mounted to the microscope support frame 25, and will actuate the relative sliding motion along the Y-axis.

The Y-axis lateral alignment support 29 is mounted on an X-axis lateral alignment support 30 such that the Y-axis lateral alignment support 29 may slide relative to the X-axis lateral alignment support 30 along the X-axis, as indicated by the reference coordinate system 24. The X-axis lateral alignment actuator 21 is mounted to the Y-axis lateral alignment support 29, and will actuate the relative sliding motion along the X-axis.

The X-axis lateral alignment support 30 is mounted to a lateral alignment assembly support 31. The lateral alignment assembly support 31 is mounted to the lever assembly 5. It will be apparent to one skilled in the art that the mountings between the microscope support frame 25, the Y-axis lateral alignment support 29, the X-axis lateral alignment support 30, and the lateral alignment assembly support 31 may be rearranged from the above description without departing from the spirit and scope of the present invention.

Referring to exemplary FIGS. 6 and 7, there are shown two views of the actuator lens tilt assembly 15. FIG. 6 represents a left side view of the actuator lens tilt assembly 15 according to one aspect of the invention. FIG. 7 represents a front view of the same actuator lens tilt assembly 15. The actuator lens tilt assembly 15 comprises an X-axis tilt actuator 32, a Y-axis tilt actuator 33, and a flexure assembly 34. The X-axis tilt actuator 32 is mounted to the lever assembly 5 and against an X-axis lever 35. The X-axis lever 35, at the end nearest the X-axis tilt actuator 32, is biased against the lever assembly 5, and at the other end is mounted to the flexure assembly 34. The Y-axis tilt actuator 33 is mounted to the lever assembly 5 and against a Y-axis lever 36. The Y-axis lever 36, at the end nearest the Y-axis tilt actuator 33, is biased against the lever assembly 5, and at the other end is mounted to the flexure assembly 34.

The flexure assembly 34 comprises a plurality of flexure plates 37-1, 37-2, 37-3, 37-4, a flexure support ring 38, and a plurality of flexure support plates 39. Flexure plate 37-1 is mounted at one end to the flexure support ring 38, and mounted at its other end to the X-axis lever 35 and the housing 16. Flexure plate 37-3 is mounted opposite flexure plate 37-1 to the flexure support ring 38 and to the housing 16. Flexure plate 37-4 is mounted at one end to the Y-axis lever 36 and the flexure support ring 38, and mounted at its other end to a flexure support plate 39. Flexure plate 37-4 is mounted at a 90 degree interval from both flexure plate 37-1 and flexure plate 37-3. Flexure plate 37-2 is mounted opposite flexure plate 37-2 to the flexure support ring 38 and to a flexure support plate 39. The flexure support plates 39 are mounted to the lever assembly 5.

Flexure plates 37-1, 37-2, 37-3, 37-4 each lie in a separate plane. The planes in which flexure plates 37-1 and 37-3 lie intersect along a line through an intersection point 40. The planes in which flexure plates 37-2 and 37-4 lie intersection along a line through the intersection point 40. The lines may be orthogonal to each other.

The operation of the actuator lens tilt assembly 15 will be described with respect to a downward motion imparted on each of the tilt actuators, the X-axis tilt actuator 32 and the Y-axis tilt actuator 33.

A downward motion of the X-axis tilt actuator 32 imparts a downward motion on the X-axis lever 35. This downward force produces a counterclockwise rotational force on flexure plate 37-1 about the point where flexure plate 37-1 is mounted to the flexure support ring 38. The downward force also translates into a counterclockwise rotational force on flexure plate 37-3 about the point where flexure plate 37-3 is mounted to the flexure support ring 38. These two rotational forces cause rotation about the intersection of the two planes in which the flexure plates 37-1, 37-3 lie. This intersection occurs at intersection point 40.

A downward motion of the Y-axis tilt actuator 33 imparts a downward force on the Y-axis lever 36. This downward force produces a clockwise rotational force on flexure plate 37-4 about the point where flexure plate 37-4 is mounted to the flexure support plate 39. Because of the rigidity of the flexure support ring 38, this rotational force translates into a clockwise rotational force on flexure plate 37-2 about the point where flexure plate 37-2 is mounted to the flexure support plate 39. These two rotational forces cause rotation about the intersection of the two planes in which the flexure plates 37-2 and 37-4 lie. This intersection occurs at intersection point 40.

Figure 8:
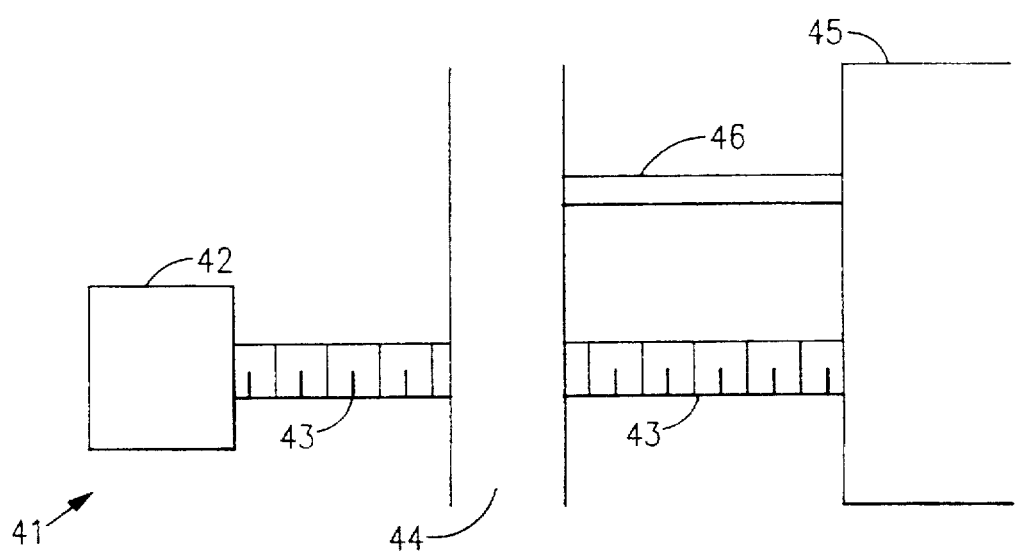
FIG. 8 is a view of an alignment actuator.

Referring to exemplary FIG. 8, there is shown one embodiment of an alignment actuator 41. The alignment actuator 41 may be a tilt actuator or a lateral alignment actuator, as described above. The alignment actuator 41 contains a handle 42 and a threaded body 43. The threaded body 43 is threadably mounted through a fixed surface 44 and against a movable surface 45. The movable surface 45 is biased toward the fixed surface 44 by a spring 46 or other suitable biasing means. The mounting of the movable surface 45 determines whether the force by the alignment actuator 41 or the biasing by the spring 46 produces a lateral or rotational force. The alignment actuator 41 may include what is commonly referred to as a micrometer stage.

Figure 9:
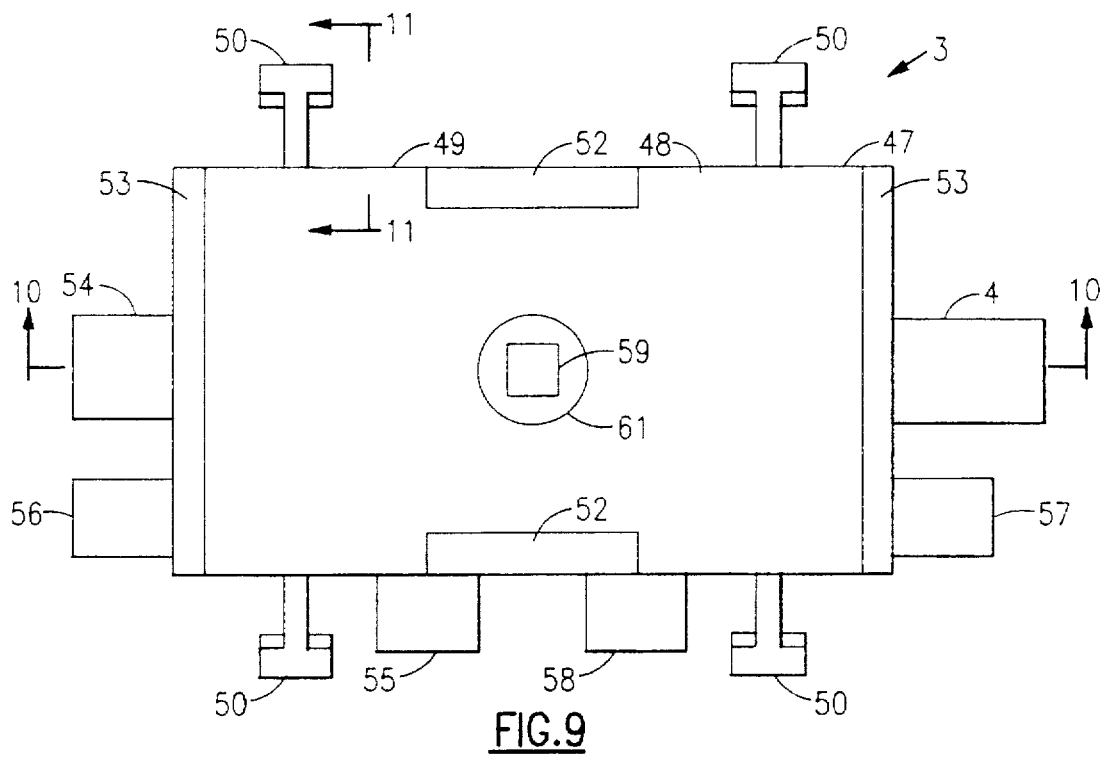
FIG. 9 is a top view of one embodiment of the cradle assembly.
Figure 10:
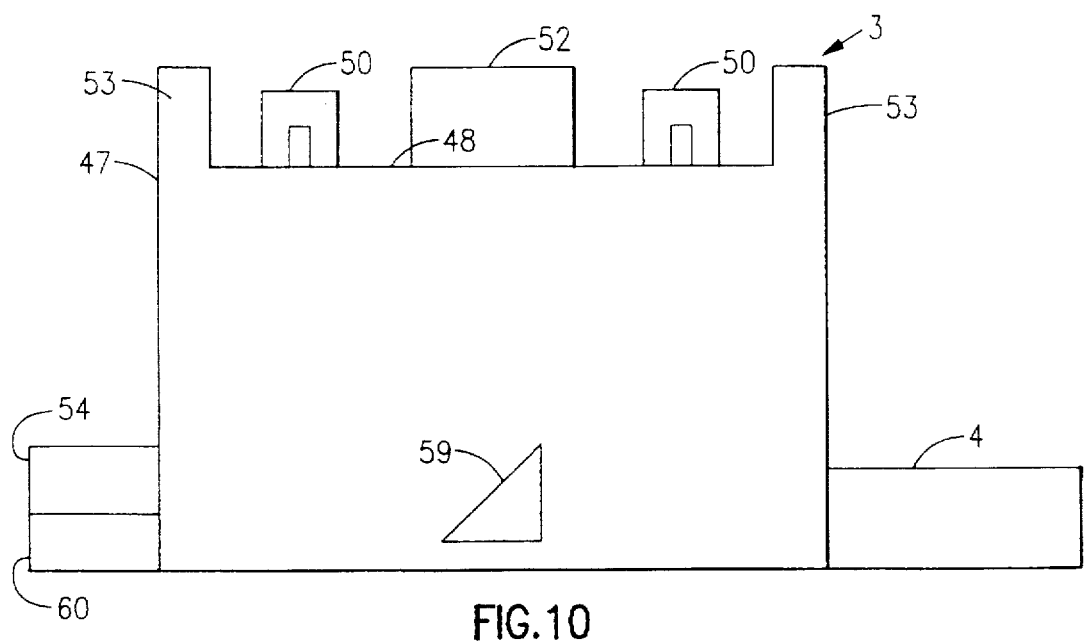
FIG. 10 is a cross-sectional view of one embodiment of the cradle assembly, taken along line 10—10 of FIG. 9.

Referring to exemplary FIG. 9, there is shown a top view of the cradle assembly 3. Referring to exemplary FIG. 10, there is shown a cross-sectional view of the cradle assembly 3, taken along line 10—10 of FIG. 9. The cradle assembly 3 comprises a cradle 47 having a surface 48 and a side 49, a plurality of vacuum clamps 50, and a baseplate alignment assembly (not shown). The cradle includes side walls 52 and end walls 53 for securing a baseplate assembly (not shown) in the cradle 47. In the embodiment particularly shown in exemplary FIGS. 9 and 10, the baseplate alignment assembly (not shown) comprises a source of radiant energy 54, a Y-axis source lateral actuator 55, a Z-axis source lateral actuator 56, an X-axis cradle assembly tilt actuator 57, a Y-axis cradle assembly tilt actuator 58, a mirror 59, and an alignment analyzer 60. In another embodiment, the baseplate alignment assembly (not shown) comprises a source of radiant energy 54, an X-axis cradle assembly tilt actuator 57, a Y-axis cradle assembly tilt actuator 58, a mirror 59, and an alignment analyzer 60. In both embodiments, the mirror 59 is aligned below a hole 61 in the surface 48 of the cradle 47. Additionally, the source of radiant energy 54 and the alignment analyzer 60 may be combined in an auto-collimater or an autocollimater/telescope.

Figure 11:
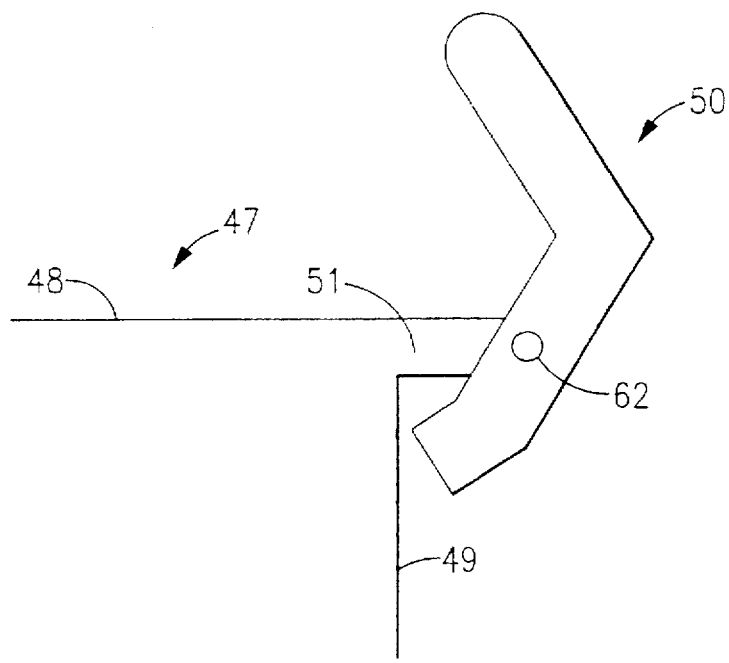
FIG. 11 is a cross-sectional view of one embodiment of a vacuum clamp in the open position, taken along line 11—11 of FIG. 9.
Figure 12:
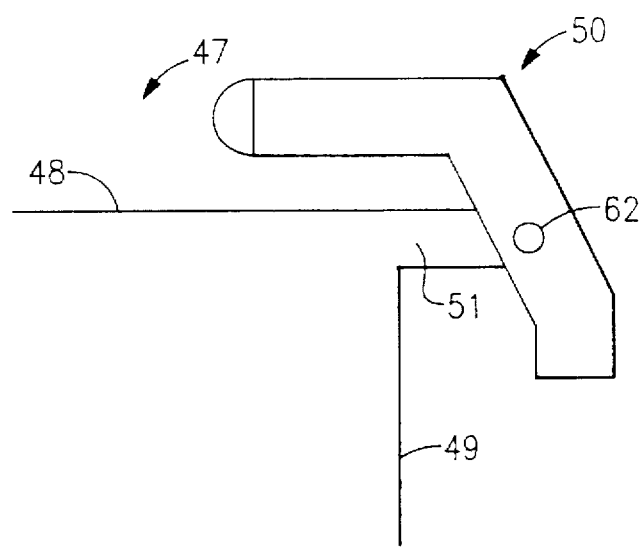
FIG. 12 is a cross-sectional view of one embodiment of a vacuum clamp in the closed position, taken along line 11—11 of FIG. 9.

Referring to exemplary FIG. 11, a cross-sectional view of a vacuum clamp 50 is shown in the open position. Exemplary FIG. 12 shows a cross-sectional view of a vacuum clamp 50 in the closed position. The surface 48 of the cradle 47 extends laterally beyond the side 49 of the cradle 47. A vacuum clamp 50 with a U-shaped cross-section is placed over the extension of the cradle 47, with one leg of the U-shape on each side of the extension. A pivot pin 62 is placed through each leg of the U-shape and through the extension of the cradle 47. In the open position, a baseplate assembly can be placed on the cradle 47. Once in place, a pneumatic tube (not shown) biases the vacuum clamp 50 to the closed position, securing the baseplate against movement.

Figure 13:
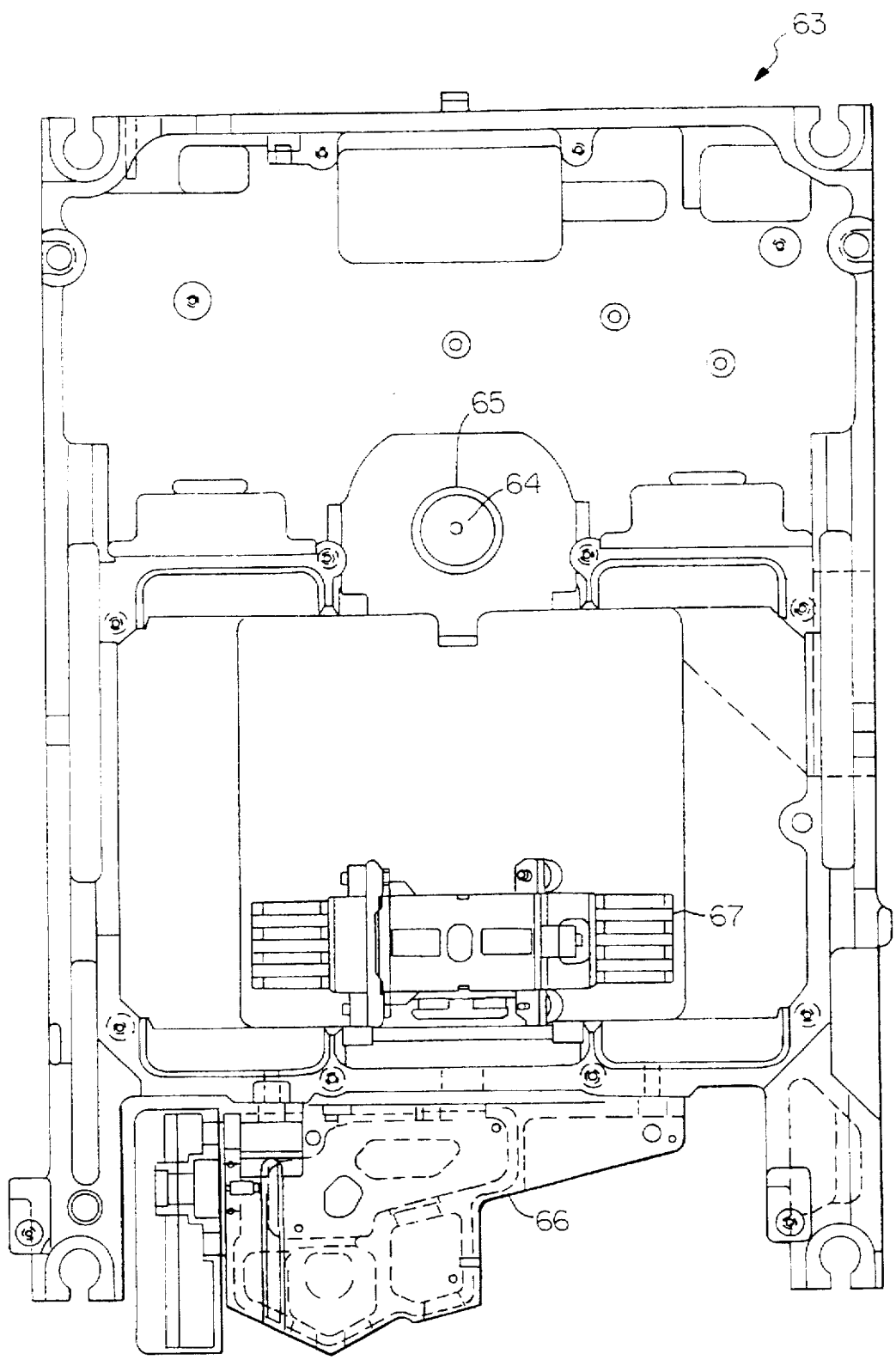
FIG. 13 is a top view of a baseplate assembly.

In operation, as shown in exemplary FIG. 13, a baseplate assembly 63 is provided. The baseplate assembly 63 contains a spindle 64 and a spindle motor 65 for rotating an information-bearing disk, and a spindle servo (not shown) for controlling the speed of the spindle motor 65. The baseplate assembly 63 further contains an optics module assembly 66. The baseplate assembly 63 also contains a carriage motor (not shown) and a carriage assembly 67 for directing a beam of radiant energy from the optics module assembly 66 toward a position on the information-bearing disk, and a carriage control servo (not shown) for controlling the position of the carriage assembly. At this point, the carriage assembly 67 does not contain an actuator lens for focussing the beam of radiant energy on the information-bearing disk. The carriage assembly 67 may be held in place relative to the spindle 64 by a carriage stop (not shown).

The baseplate assembly 63 is placed on the surface 48 of the cradle 47 and secured with the vacuum clamps 50. A test disk of glass or other suitable material (not shown) is placed on the spindle of the baseplate assembly 63. The gripper assembly 2 is then lowered into the closed position.

The source of radiant energy 54 radiates two cradle alignment beams of radiant energy toward the mirror 59. The first cradle alignment beam is reflected from the mirror 59, then passes through the hole 61 in the cradle 47 and through the baseplate assembly 63. The first cradle alignment beam reflects off the test disk and is received by the alignment analyzer 60. The second cradle alignment beam is reflected from the mirror 59, then passes through the hole 61 in the cradle 47 and through the baseplate assembly 63. The second cradle alignment beam reflects off the substrate 20 and is received by the alignment analyzer 60. By analyzing the relative positions of the first and second cradle alignment beams, the alignment analyzer 60 determines the tilt of the test disk with respect to the substrate 20. It will be obvious that the mirror 59 may comprise two parallel mirrors, each reflecting one of the cradle alignment beams.

Tilt between the test disk and the substrate 20 is corrected in the following manner. The X-axis cradle assembly tilt actuator 57 tilts the cradle assembly 3 about the X-axis. The Y-axis cradle assembly tilt actuator 58 tilts the cradle assembly 3 about the Y-axis. Acting together, the cradle assembly tilt actuators 57, 58 tilt the cradle assembly 3, including the test disk, with respect to the substrate 20. Because the substrate 20 is orthogonal to the tower optical axis, this action tilts the cradle assembly 3 with respect to the tower optical axis. Each of the actuators 57, 58 may be an alignment actuator 41 as shown in exemplary FIG. 8.

In one embodiment, lateral alignment of the cradle assembly 3 with respect to the tower optical axis is done mechanically, and is not tested or measured. In another embodiment, if the cradle alignment beam is not received by the alignment analyzer 60, or is off-center when received by the alignment analyzer 60, the position of the source of radiant energy 54 can be moved using the Y-axis source lateral actuator 55 and the Z-axis source lateral actuator 56. As shown best in FIG. 9, the mirror 59 is situated such that a change in the position of the source of radiant energy 54 along the Y-axis is translated into a change in the position of the cradle alignment beam along the Y-axis as it is received by the alignment analyzer 60. The Y-axis source lateral actuator 55 effects this change in position. Similarly, a change in the position of the source of radiant energy 54 along the Z-axis is translated into a change in the position of the cradle alignment beam along the X-axis as it is received by the alignment analyzer 60. The Z-axis source lateral actuator 56 effects this change in position. Each of the actuators 55, 56 may be an alignment actuator 41 as shown in exemplary FIG. 8.

In the embodiment particularly described below, all references to a coordinate system are made in accordance with reference coordinate system 24 shown in exemplary FIG. 5. This reference coordinate system 24 is chosen for purposes of explanation only, and it will be obvious to one skilled in the art that any convenient coordinate system could be chosen without departing from the spirit and scope of the present invention.

Once aligned, the source of radiant energy 54 is turned off and the test disk is removed. If not previously aligned, the carriage assembly of the baseplate assembly 63 is moved in approximate alignment with the assembly axis, and an actuator lens is placed within the carriage assembly of the baseplate assembly 63 and is allowed to assume a natural rest position. The lever assembly 5 is lowered to the closed position.

A pressure differential is then created between the vacuum chuck 12 and the atmosphere. This pressure differential operates to hold the actuator lens against the vacuum chuck 12, while maintaining the orientation of the actuator lens. Additionally, the optical center of the actuator lens is maintained at the intersection point 40. This optical center may also be substantially at the center of mass of the actuator lens.

An adjustable power supply is attached to the radiant energy source within the optics module assembly 66. The radiant energy source projects a lens alignment beam of radiant energy into the carriage assembly. Within the carriage assembly, the lens alignment beam passes through the penta prism and through the actuator lens. The lens alignment beam then passes through the substrate 20, through the microscope objective lens 19, and into the tower assembly 1, where the lens alignment beam passes through the tower magnifying lens 6 and is received by the video camera 7. The analysis assembly 9 then displays and analyzes the spot profile of the lens alignment beam.

If the lens alignment beam is not received by the video camera 7 and passed to the analysis assembly 9, the X-axis lateral alignment actuator 21 and the Y-axis lateral alignment actuator 22 are used to move the microscope objective lens 19 laterally with respect to the tower assembly 1. The X-axis lateral alignment actuator 21 and the Y-axis lateral alignment actuator 22 may be alignment actuators 41 as shown in exemplary FIG. 8.

If the lens alignment beam is not focussed properly in the video camera 7 and analysis assembly 9, the focus actuator 23 is used to move the microscope objective lens 19 toward or away from the tower assembly 1 until the lens alignment beam is in proper focus within the video camera 7 and analysis assembly 9. The focus actuator 23 may be an alignment actuator 41 as shown in exemplary FIG. 8.

Once focussed properly, the analysis assembly 9 analyzes the profile of the beam for coma and astigmatism, as the cradle alignment beam was previously analyzed. If these optical aberrations occur, the actuator lens tilt assembly 15 operates to minimize these aberrations by aligning the actuator lens. As described above, the X-axis tilt actuator 32 rotates the actuator lens about the X-axis. Likewise, the Y-axis tilt actuator 33 rotates the actuator lens about the Y-axis. Together, the actuator lens tilt assembly 15 can rotate the actuator lens in any direction with respect to the lens alignment beam, while maintaining the optical center or the center of mass of the actuator lens at the intersection point 40.

Once the misalignment is corrected to within an acceptable tolerance, the gripper assembly 2, including the vacuum chuck 12 and the actuator lens, is raised to the open position. A fastening agent is placed on the pedestals of the carriage assembly, and the gripper assembly 2 is again lowered to the closed position. The actuator lens is secured by the fastening agent to the carriage assembly, without changing the orientation of the actuator lens established by the actuator lens tilt assembly 15. The fastening agent may be a selectably-curable adhesive, such as ultraviolet radiation-curable adhesive.

Once the fastening agent has cured, the actuator lens is tested for alignment. As above, a lens alignment beam is radiated through the actuator lens, the substrate 20, the microscope objective lens 19, the tower magnifying lens 6, and into the video camera 7. The analysis assembly 9 then analyzes the spot profile of the lens alignment beam. Each of the alignments described above may need to be adjusted for this testing process. Depending on its configuration, the vacuum chuck 12 may need to be retracted or removed to avoid contacting and damaging the carriage assembly.

In another embodiment of the invention, the cradle assembly 3 may comprise a plurality of cradles 47, a plurality of vacuum clamps 50, and a baseplate alignment assembly (not shown). The cradles 47 may be movable with respect to the tower assembly 1, and there may be either one baseplate alignment assembly (not shown) for each cradle 47, or a single baseplate alignment assembly (not shown) which aligns only the cradle 47 presently in position with respect to the tower assembly 1. Further, there may be a single source of radiant energy 54 and set of actuators 55, 56, 57, 58 regardless of the number of cradles 47, with one mirror 59 associated with each cradle 47.

According to this embodiment, there may be a second tower assembly 1 identical to the first tower assembly 1 described above. In addition, there may be a second gripper assembly 2 associated with the second tower assembly 1 as described above. The second gripper assembly 2 will not contain a vacuum chuck 12.

In operation, the first tower assembly 1 and first gripper assembly 2 operate as described in the previous embodiment. After fastening the actuator lens to the carriage assembly with the fastening agent, the cradle 47 containing the baseplate assembly 63 is moved beneath the second tower assembly 1 and second gripper assembly 2. Again, a lens alignment beam of radiant energy is projected by the optics module assembly 66 through the same path in the second tower assembly 1 and second gripper assembly 2 as described with respect to the first tower assembly 1 and first gripper assembly 2. The analysis assembly 9 associated with the second tower assembly 1 analyzes the spot profile of the lens alignment beam after the actuator lens is fastened to the baseplate assembly 63. It will be obvious to one skilled in the art that, by allowing the vacuum chuck 12 to be removable or retractable, the first tower assembly 1 and first gripper assembly 2 may function as the second tower assembly 1 and second gripper assembly 2, respectively.

It will be obvious to one skilled in the art that modifications to the above description of the invention may be made without departing from the spirit and scope of the invention. The scope of the invention, therefore, is indicated by the appended claims rather than the above description.

While this invention has been explained with reference to the structure disclosed herein, it is not confined to the details set forth and this application is intended to cover any modifications and changes as may come within the scope of the following claims:

What is claimed is:

1. A method of focusing a beam of radiant energy onto an optical disc, comprising the steps of:

directing a beam of radiant energy through an objective lens onto an optical disc;

aligning the beam of radiant energy with respect to the optical disc with an alignment assembly while maintaining the optical center of said objective lens at a predetermined intersection point;

receiving a return beam of radiant energy reflected from said optical disc;

analyzing the spot profile of said return beam by an analyzer; and moving the objective lens toward and away from the optical disc using a focus actuator until said analyzer indicates that the beam is in proper focus.

2. The method according to claim 1 wherein the step of aligning the beam of radiant energy includes adjusting the x-axis tilt of the objective lens by rotating the lens about an axis collinear with the intersection of two planes defined by first and second x-axis flexure plates.

3. The method according to claim 2 wherein said step of aligning the beam of radiant energy includes adjusting the y-axis tilt of the objective lens by rotating the lens about a line collinear with the intersection of two planes defined by first and second y-axis flexure plates.

4. The method according to claim 3 wherein said step of aligning the beam of radiant energy includes aligning the beam of radiant energy while maintaining the optical center of said objective lens at a predetermined intersection point defined-by said first and second y-axis flexure plates.

5. The method according to claim 4 further comprising:

directing first and second tilt alignment beams toward said optical disc;

receiving said tilt alignment beams reflected from said optical disc; and analyzing the relative positions of the received first and second alignment beams to determine the tilt of the objective lens with respect to the optical disc.

6. The method according to claim 4 further including the step of adjusting said x-axis and y-axis tilt to minimize aberrations in said analyzed spot profile.

7. A method according to claim 4 further including the step of adjusting said x-axis and y-axis tilt to minimize aberrations in said analyzed spot profile.

8. The method according to claim 1 wherein said step of aligning the beam of radiant energy comprises:

determining the x-axis lateral alignment of the objective lens; and adjusting the x-axis and y-axis lateral alignment of the objective lens in accordance with said determination of x-axis and y-axis lateral alignment.

9. The method according to claim 8 further comprising:

directing a lateral alignment beam towards said optical disc;

receiving said lateral alignment beam reflected off said optical disc; and analyzing the position of said received alignment beam to determine the lateral alignment of the objective lens with respect to the optical disc.

10. An optical disc drive system having a carriage assembly with an objective lens focused by the method according to claim 1.

11. A method of adjusting the position of an objective lens with respect to an optical disc, said method comprising the steps of:

placing an objective lens in a carriage assembly;

directing a beam of radiant energy through said objective lens onto said optical disc;

aligning the beam of radiant energy with respect to the optical disc with an alignment assembly while maintaining the optical center of said objective lens at a predetermined intersection point;

receiving a return beam of radiant energy reflected from said optical disc;

analyzing the spot profile of said return beam by an analyzer; and moving the objective lens toward or away from the optical disc using a focus actuator until said analyzer indicates that the beam is in proper focus.

12. The method according to claim 11 wherein the step of aligning the beam of radiant energy includes adjusting the x-axis tilt of the objective lens by rotating the lens about an axis collinear with the intersection of two planes defined by first and second x-axis flexure plates.

13. The method according to claim 12 wherein said step of aligning the beam of radiant energy includes adjusting the y-axis tilt of the objective lens by rotating the lens about a line collinear with the intersection of two planes defined by first and second y-axis flexure plates.

14. The method according to claim 13 wherein said step of aligning the beam of radiant energy includes aligning the beam of radiant energy while maintaining the optical center of said objective lens at a predetermined intersection point defined by said first and second y-axis flexure plates.

15. The method according to claim 14 further including the steps of:

directing first and second tilt alignment beams toward said optical disc;

receiving said tilt alignment beams reflected from said optical disc; and analyzing the relative positions of the received first and second alignment beams to determine the tilt of the objective lens with respect to the optical disc.

16. The method according to claim 11 wherein said step of aligning the beam of radiant energy comprises:

determining the x-axis lateral alignment of the objective lens; and adjusting the x-axis and y-axis lateral alignment of the objective lens in accordance with said determination of x-axis and y-axis lateral alignment.

17. The method according to claim 16 further including the steps of:

directing a lateral alignment beam towards said optical disc;

receiving said lateral alignment beam reflected from said optical disc;

analyzing the position of said received alignment beam to determine the lateral alignment of the objective lens with respect to the optical disc.

18. An optical disc drive system having a carriage assembly with an objective lens positioned by the method according to claim 11.

* * * * *

UNITED STATES PATENT AND TRADEMARK OFFICE
CERTIFICATE OF CORRRECTION

Page 1 of 2

PATENT NO. : 5,790,325
DATED : August 4, 1998
INVENTOR(S) : Frassens, et. al.

It is certified that error appears in the above-identified patent and that said Letters Patent is hereby corrected as shown below:

Title page, item [56], insert the following:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 3 | 4 | 0 | 0 | 5 | 9 | 7 | 9/10/68 | Nater | | | |
| | | 4 | 7 | 7 | 2 | 1 | 2 | 3 | 9/20/88 | Radner | | | |
| | | 5 | 0 | 7 | 9 | 6 | 4 | 1 | 1/7/92 | Marino et al. | | | |
| | | | | | | | | | | | | | |

UNITED STATES PATENT AND TRADEMARK OFFICE
CERTIFICATE OF CORRRECTION

PATENT NO. : 5,790,325
DATED : August 4, 1998
INVENTOR(S) : Grassens, et. al.

It is certified that error appears in the above-identified patent and that said Letters Patent is hereby corrected as shown below:

Title page, item [56], insert the following:

FOREIGN PATENT OR PUBLISHED FOREIGN PATENT APPLICATION

| | | DOCUMENT NUMBER | | | | | PUBLICATION DATE | COUNTRY OR PATENT OFFICE | CLASS | SUBCLASS | TRANSLATION YES | NO |
|---|---|---|---|---|---|---|---|---|---|---|---|---|
| | | 1 | 9 | 6 | 1 | 9 | 1 | 3 | 7/1/71 | Germany | | | | |
| | | 4 | 0 | 3 | 8 | 7 | 2 | 7 | 6/11/92 | Germany | | | | |
| | | 5 | 9 | 2 | 7 | 6 | 6 | | 4/20/94 | Europe | | | | |
| | | 1 | 0 | 9 | 7 | 8 | 3 | 2 | 4/17/89 | Japan | | | | |
| | | 5 | 9 | 1 | 0 | 73 | 0 | 7 | 6/21/84 | Japan | | | | |
| | | 6 | 0 | 1 | 9 | 79 | 4 | 2 | 10/7/85 | Japan | | | | |
| | | 6 | 3 | 1 | 0 | 39 | 3 | 2 | 5/9/88 | Japan | | | | |

Signed and Sealed this

Sixth Day of April, 1999

Attest:

*Attesting Officer*

Q. TODD DICKINSON

*Acting Commissioner of Patents and Trademarks*

UNITED STATES PATENT AND TRADEMARK OFFICE
CERTIFICATE OF CORRECTION

PATENT NO.  : 5,790,325
DATED       : August 4, 1998
INVENTOR(S) : Grassens et al.

It is certified that error appears in the above-identified patent and that said Letters Patent is hereby corrected as shown below:

Drawing,
Add Fig. 14.

Column 1,
Line 20, delete -- of -- between "Because" and "the information storage".
Line 27, insert -- art -- between "prior" and "optical system".
Line 34, insert -- art -- between "This prior" and "optical system requires".

Column 3,
Line 20, insert in indented paragraph form -- Fig. 14 is a pictorial representation illustrating the focusing of an objective lens according to the methods of the present invention. --
Line 32, delete "A line between" and insert therefor -- A line (not shown) between --

Column 5,
Line 21, delete "37-1, 37-2, 37-3, 37-4" and insert therefor -- 71, 72, 73, 74 -- between "plates" and ", a flexure support ring 38,".
Line 22, delete "37-1" and insert therefor -- 71-- between "Flexure plate" and "is mounted at one end".
Line 25, delete "37-3" and insert therefor -- 73 -- between "Flexure plate" and "is mounted opposite".
Line 26, delete "37-1" and insert therefor -- 71 -- between "plate" and "to the flexure support ring 38".
Line 27, delete "37-4" and insert therefor -- 74 -- between "Flexure plate" and "is mounted at one end to the Y-axis".
Line 29, delete "37-4" and insert therefor -- 74 -- between "Flexure plate" and "is mounted at a 90 degree".
Lines 30-31, delete "flexure plate 37-1 and flexure plate 37-3. Flexure plate 37-2" and insert therefor -- flexure plate 71 and flexure plate 73. Flexure plate 72 -- between "interval from both" and "is mounted opposite".
Line 32, delete "37-2" and insert therefor -- 74 --between "flexure plate" and "to the flexure support ring 38".
Line 35, delete "37-1, 37-2, 37-3, 37-4" and insert therefor -- 71, 72, 73, 74 -- between "Flexure plates" and "each lie in a separate".
Line 36, delete "37-1 and 37-3" and insert therefor -- 71 and 73 -- between "flexure plates" and "lie intersect along".
Line 38, delete "37-2 and 37-4" and insert therefor -- 72 and 74 -- between "flexure plates" and "lie intersection".
Line 48, delete "37-1" and insert therefor -- 71 -- between "-ure plate and "about the point".

UNITED STATES PATENT AND TRADEMARK OFFICE
CERTIFICATE OF CORRECTION

PATENT NO. : 5,790,325
DATED : August 4, 1998
INVENTOR(S) : Grassens et al.

Page 2 of 4

It is certified that error appears in the above-identified patent and that said Letters Patent is hereby corrected as shown below:

Column 5, cont'd,
Line 48-49, delete "37-1" and insert therefor -- 71 -- between "where flexure plate" and "is mounted to the flexure".
Line 51, delete "flexure plate 37-3 about the point where flexure plate 37-3" and insert therefor -- flexure plate 73 about the point where flexure plate 73 -- between "rotational force on" and "is mounted on the flexure support ring".
Line 54, delete "flexure plates 37-1, 37-3" and insert therefor -- flexure plates 71, 73 -- between "two planes in which" and "lie.".
Line 59, delete "37-4 about the point where flexure plate 37-4" and insert therefor -- 74 about the point where flexure plate 74 -- between "flexure plate" and "is mounted to".
Line 62, delete "37-2" and insert therefor -- 72 -- between "flexure plate" and "about the".
Line 63, delete "37-2" and insert therefor -- 72 -- between "flexure plate" and" is mounted to the".
Line 66, delete "37-2 and 37-4" and insert therefor -- 72 and 74 -- between "plates" and lie.".

Column 6,
Lines 34-35, delete "auto-collimater or an auto-collimater/telescope" and insert therefor -- auto-collimator or an autocollimator/telescope -- between "combined in an" and "."
Lines 40-41, delete "A vacuum clamp 50 with" and insert therefor -- The vacuum clamp 50, having -- between "of the cradle 47." and "a U-shaped cross-".
Lines 41-42, delete "section is placed over the extension" and insert therefor -- section, is placed over the extension 51 -- between "U-shaped cross-" and "of the cradle 47".
Line 43, "U-shape on each side of the extension" and insert therefor -- "U" on each side of the extension 51 -- between "one leg of the" and ".A pivot pin 62".

Column 7,
Line 64, please insert -- (not shown) -- between "actuator lens" and "is placed within the carriage".

Column 8,
Line 14, delete "the penta prism" and insert therefor -- a pentaprism (not shown) -- between "passes through" and "and through the actuator lens".
Line 58, delete "selectably-curable" and insert therefor -- selectably curable -- between "agent may be a" and "adhesive,".
Line 59, delete "radiation-curable" and insert therefor -- radiation curable -- between "such as ultraviolet" and "adhesive."

UNITED STATES PATENT AND TRADEMARK OFFICE
CERTIFICATE OF CORRECTION

PATENT NO.    : 5,790,325
DATED         : August 4, 1998
INVENTOR(S)   : Grassens et al.

It is certified that error appears in the above-identified patent and that said Letters Patent is hereby corrected as shown below:

Column 9,
Lines 41-50, delete the following paragraphs:

"It will be obvious to one skilled in the art that modifications to the above description of the invention may be made withour departing from the spirit and scope of the invention. The scope of the invention, therefore, is indicated by the appended claims rather than the above description.

While this invention has been explained with reference to the structure disclosed herein, it is not confined to the details set forth and this application is intended to cover any modifications and changes as may come within the scope of the following claims:" and in place thereof insert the following paragraphs:

-- With reference now to Fig. 14, there is shown a method of focusing a beam of radiant energy 76 onto an optical disc 78. The beam of radiant energy 76 may be provided by the source of radiant energy 54 shown in Fig. 9. The method of focusing the beam of radiant energy 76 onto the optical disc 78 includes the step of directing the beam of radiant energy 76 through an objective lens 80 onto the optical disc 78. The objective lens 80 may be held in position by the actuator lens receiving opening 18 of the microscope objective lens assembly shown in Fig. 4. As indicated above, the actuator lens may be an objective lens. The present method further includes the step of aligning the beam of radiant energy 76 with respect to the optical disc 78 with the alignment assembly 14, Fig. 5, while maintaining the optical center of the objectives lens 80 at a predetermined intersection point relative to the reference coordinate system 24. The alignment assembly 14 may advantageously include the alignment actuator 41 shown in Fig. 8. The present method also includes receiving a return beam of radiant energy 76a reflected from the optical disc 78, and analyzing the spot profile of the return beam 76a with the analyzer assembly 9 which includes the processor 10 and monitor 11. While viewing the monitor 11, the objective lens 23 may be moved toward and away from the optical disc 78 using the focus actuator 23, Fig. 5, until the analyzer assembly 9 indicates that the beam 76 is in proper focus. This method may be alternatively performed after placing the objective lens 80 in the carriage assembly 67 shown in Fig 13.

UNITED STATES PATENT AND TRADEMARK OFFICE
CERTIFICATE OF CORRECTION

PATENT NO. : 5,790,325      Page 4 of 4
DATED : August 4, 1998
INVENTOR(S) : Grassens et al.

It is certified that error appears in the above-identified patent and that said Letters Patent is hereby corrected as shown below:

While this invention has been described in detail with reference to certain preferred embodiments, it should be appreciated that the present invention is not limited to those precise embodiments. Rather, in view of the present disclosure which describes the current best mode for practicing the invention, many modifications and variations would present themselves to those of skill in the art without departing from the scope and spirit of this invention. The scope of the invention is, therefore, indicated by the following claims rather than by the foregoing description. All changes, modifications, and variations coming within the meaning and range of equivalency of the claims are to be considered within their scope. --.

Signed and Sealed this

Twenty-fifth Day of December, 2001

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 5,790,325  
DATED : August 4, 1998  
INVENTOR(S) : Grassens et al.

Page 1 of 1

It is certified that error appears in the above-identified patent and that said Letters Patent is hereby corrected as shown below:

Title page,  
Item [56] References Cited, U.S. PATENT DOCUMENTS, insert the following:

| | | |
|---|---|---|
| -- 3400597 | 9/10/68 | Nater |
| 4772123 | 9/20/88 | Radner |
| 5079641 | 1/7/92 | Marino et al. |

Item [56] References Cited, FOREIGN PATENT DOCUMENTS, insert the following:

| | | |
|---|---|---|
| 1961913 | 7/1/71 | Germany |
| 4038727 | 6/11/92 | Germany |
| 592766 | 4/20/94 | Europe |
| 1097832 | 4/17/89 | Japan |
| 59107307 | 6/21/84 | Japan |
| 60197942 | 10/7/85 | Japan |
| 63103932 | 5/9/88 | Japan |

Signed and Sealed this

Twenty-ninth Day of January, 2002

Attest:

Attesting Officer

JAMES E. ROGAN  
*Director of the United States Patent and Trademark Office*